United States Patent
More et al.

(10) Patent No.: US 11,557,937 B2
(45) Date of Patent: Jan. 17, 2023

(54) GENSET ENCLOSURES WITH LOW ACOUSTIC NOISE

(71) Applicant: Cummins Power Generation IP, Inc., Minneapolis, MN (US)

(72) Inventors: Shashikant Ramdas More, Minneapolis, MN (US); Nick Heimann, Minneapolis, MN (US); Chitragupt Kulkarni, Minneapolis, MN (US); Doc Weidknecht, Minneapolis, MN (US)

(73) Assignee: Cummins Power Generation IP, Inc., Minneapolis, MN (US)

( * ) Notice: Subject to any disclaimer, the term of this patent is extended or adjusted under 35 U.S.C. 154(b) by 560 days.

(21) Appl. No.: 16/680,007

(22) Filed: Nov. 11, 2019

(65) Prior Publication Data

US 2020/0161931 A1 May 21, 2020

Related U.S. Application Data

(60) Provisional application No. 62/767,918, filed on Nov. 15, 2018.

(51) Int. Cl.
*H02K 5/24* (2006.01)
*F02B 63/04* (2006.01)
*G10K 11/162* (2006.01)

(52) U.S. Cl.
CPC .............. *H02K 5/24* (2013.01); *F02B 63/044* (2013.01); *G10K 11/162* (2013.01)

(58) Field of Classification Search
CPC ........ H02K 5/24; F02B 63/044; G10K 11/162
See application file for complete search history.

(56) References Cited

U.S. PATENT DOCUMENTS

| | | | |
|---|---|---|---|
| 1,628,090 | A | 5/1927 | Weiss |
| 2,088,113 | A | 7/1937 | Madison |
| 2,534,137 | A | 7/1937 | Madison |
| 2,173,797 | A | 9/1939 | Toohey et al. |
| 2,250,683 | A | 7/1941 | Slechta |

(Continued)

FOREIGN PATENT DOCUMENTS

| | | | |
|---|---|---|---|
| CN | 113700554 B | * | 4/2022 |
| EP | 0 527 484 | | 2/1993 |

(Continued)

OTHER PUBLICATIONS

International Search Report and Written Opinion issued in international Application No. PCT/US2019/060737 dated Apr. 14, 2020, fourteen (14) pages.

(Continued)

*Primary Examiner* — Forrest M Phillips
(74) *Attorney, Agent, or Firm* — Foley & Lardner LLP (57) ABSTRACT

An enclosure for a genset comprises a container defining an internal volume for housing the genset. The container comprises a container floor, a container roof, a pair of container sidewalls disposed parallel to a longitudinal axis of the container, and a pair of container endwalls disposed at longitudinal ends of the container. A side cap is positioned parallel to each of the pair of container sidewalls along a longitudinal length of the container, each of the side caps sealed to edges of the corresponding container sidewall so as to define an acoustic cavity therebetween.

21 Claims, 8 Drawing Sheets

(56) References Cited

U.S. PATENT DOCUMENTS

| | | | |
|---|---|---|---|
| 3,026,224 A | 3/1962 | Rogers, Jr. | |
| 3,087,570 A | 4/1963 | Watters et al. | |
| 3,087,574 A | 4/1963 | Watters et al. | |
| 3,176,789 A | 4/1965 | Lighter | |
| 3,262,521 A | 7/1966 | Warnaka | |
| 3,412,513 A | 11/1968 | Gosele | |
| 3,525,417 A | 8/1970 | Giraudeau | |
| 3,833,086 A | 9/1974 | Giraudeau | |
| 3,985,198 A | 10/1976 | Kurtze et al. | |
| 3,991,848 A | 11/1976 | Davis | |
| 4,007,388 A | 2/1977 | Lawyer et al. | |
| 4,317,503 A | 3/1982 | Soderquist et al. | |
| 4,340,129 A | 7/1982 | Salyers | |
| 4,705,139 A | 11/1987 | Gahlau et al. | |
| 5,186,996 A | 2/1993 | Alts et al. | |
| 5,362,931 A | 11/1994 | Fries | |
| 5,664,397 A | 9/1997 | Holz | |
| 6,024,190 A | 2/2000 | Ritzema | |
| 6,189,649 B1 | 2/2001 | Nitschke | |
| 6,450,133 B1 * | 9/2002 | Bernard | F01P 5/04 454/118 |
| 6,815,044 B2 | 11/2004 | Boock | |
| 6,951,264 B2 | 10/2005 | Byma et al. | |
| 7,011,181 B2 | 3/2006 | Albin, Jr. | |
| 7,182,172 B2 | 2/2007 | Albin, Jr. | |
| 7,631,727 B2 | 12/2009 | Thomas et al. | |
| 7,997,384 B2 | 8/2011 | Boock | |
| 8,087,494 B2 | 1/2012 | Palumbo et al. | |
| 8,230,969 B2 | 7/2012 | Frederick et al. | |
| 8,733,501 B2 | 5/2014 | Porte et al. | |
| 8,979,014 B2 | 3/2015 | Boock et al. | |
| 8,980,397 B2 | 3/2015 | Patberg et al. | |
| 10,411,556 B1 * | 9/2019 | Sakaray | F02B 63/044 |
| 2009/0280348 A1 | 11/2009 | Patberg et al. | |
| 2010/0025409 A1 * | 2/2010 | Hunter | F02B 77/13 206/319 |
| 2010/0072757 A1 * | 3/2010 | Kealy | F02B 37/001 290/1 A |
| 2011/0248117 A1 | 10/2011 | Boock et al. | |
| 2012/0145479 A1 | 6/2012 | Nishikawa et al. | |
| 2013/0147203 A1 * | 6/2013 | Gillett | F02B 63/044 290/1 A |
| 2015/0075901 A1 | 3/2015 | Beresowski | |
| 2015/0292200 A1 | 10/2015 | More | |

FOREIGN PATENT DOCUMENTS

| | | | |
|---|---|---|---|
| EP | 1 382 439 | 10/2009 | |
| EP | 3 018 320 A1 | 5/2016 | |
| GB | 1 416 687 | 12/1975 | |
| GB | 2 272 749 | 5/1994 | |
| GB | 2507822 A * | 5/2014 | F02B 63/044 |
| JP | H08-068323 A | 3/1996 | |
| WO | WO-2010/014115 A2 | 2/2010 | |
| WO | WO-2014/056548 A1 | 4/2014 | |
| WO | WO-2015048544 A1 * | 4/2015 | F01N 1/00 |
| WO | WO-2016094833 A1 * | 6/2016 | B65D 85/68 |

OTHER PUBLICATIONS

Ikea Mattress Cutaway Pictures, The Mattress Underground Forum; https://themattressundergroud.com/mattress-forum/index/13705-idea-mattress-cutaway . . . , Sep. 22, 2013, 33 pages.

* cited by examiner

GENSET ENCLOSURES WITH LOW ACOUSTIC NOISE

CROSS-REFERENCE TO RELATED APPLICATIONS

The present application claims priority to and benefit of U.S. Provisional Application No. 62/767,918, filed Nov. 15, 2018, the entire disclosure of which is hereby incorporated by reference herein.

TECHNICAL FIELD

The present disclosure relates generally to enclosures for housing commercial engines and generator sets (gensets).

BACKGROUND

Large commercial internal combustion engines and gensets are used extensively for physical power production (such as pumps or other shaft power outputs) and power generation and are deployed at a desired deployment site to meet power requirements at the deployment site. Gensets are often housed in containers such as shipping containers. The standard shipping containers used by the shipping industry generally follow the International Organization for Standardization (ISO) 6346 standard. One feature desired from genset enclosures is acoustic noise reduction. While mufflers and silencers coupled to exhaust of the genset provide acoustic noise reduction, a significant amount of noise still leaks from the container housing the genset.

SUMMARY

Embodiments described herein relate generally to enclosures for housing gensets, and in particular, to enclosures that include a container that houses the genset, and side caps mounted to sidewalls of the container so as to form an acoustic cavity therebetween, which provides significant reduction in acoustic noise.

In some embodiments, an enclosure for a genset comprises a container defining an internal volume for housing the genset. The container comprises a container floor, a container roof, a pair of container sidewalls disposed parallel to a longitudinal axis of the container, and a pair of container endwalls disposed at longitudinal ends of the container. A side cap is positioned parallel to each of the pair of container sidewalls along a longitudinal length of the container, each of the side caps sealed to edges of the corresponding container sidewall so as to define an acoustic cavity therebetween.

In some embodiments, a method for reducing acoustic noise emanating from a container configured to house a genset comprises: cutting a first container in half along a longitudinal axis thereof to form a side cap first portion and a side cap second portion; removing a roof of the side cap first portion; disposing the side cap second portion on top of the side cap first portion to form a side cap; disposing the side cap parallel to a corresponding container sidewall of the container housing the genset; and securing the side cap to the container.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION

Embodiments described herein relate generally to enclosures for housing gensets, and in particular, to enclosures that include a container that houses the genset, and side caps mounted to sidewalls of the container so as to form an acoustic cavity therebetween, which provides significant reduction in acoustic noise.

Embodiments described herein may provide one or more of several advantages including, for example: (1) mounting side caps on sidewalls of genset containers, thereby forming acoustic cavities therebetween that provide additional reduction in acoustic noise; (2) forming the side caps from standard containers, thereby facilitating manufacturing; (3) providing additional acoustic noise reduction by using various acoustic layers including an acoustic barrier layer and an acoustic dampening material layer; and (4) providing greater than 50 dB reduction in acoustic noise generated by a genset.

While embodiments described herein generally refer to enclosures including containers such as ISO containers, it should be understood that various embodiments described herein are equally applicable to any container or housing, for example, any housing made from flat sheet metal or die-stamped sheet metal.

Figure 1:
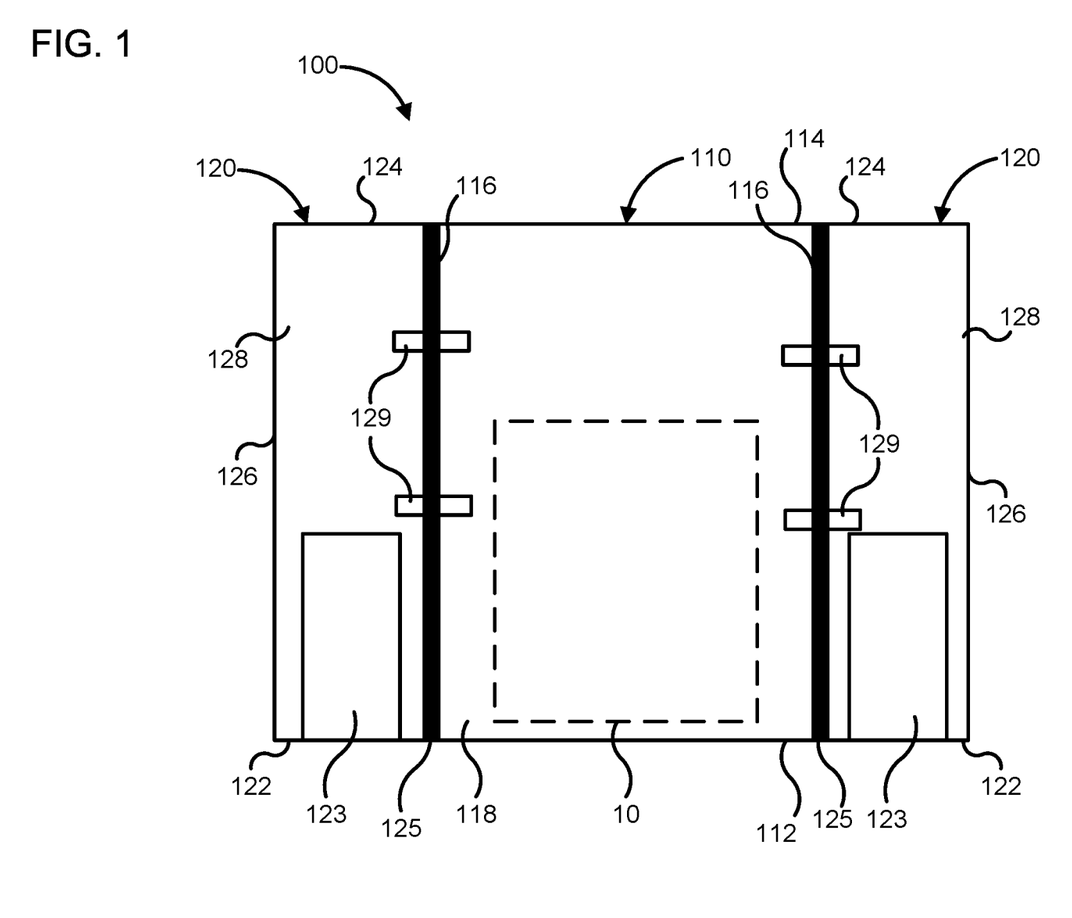
FIG. 1 is an end view of an enclosure for housing a genset, according to an embodiment.
Figure 2:
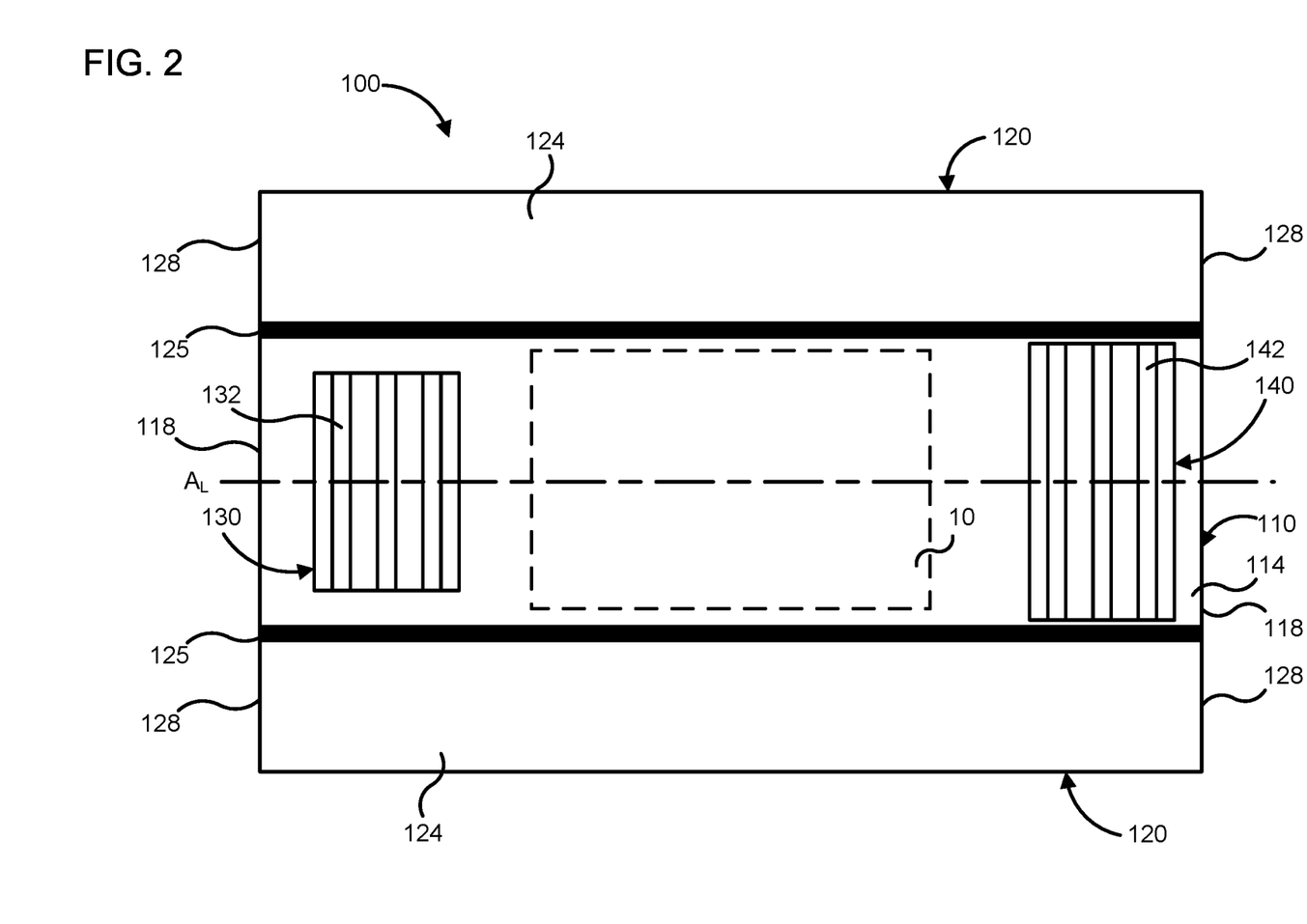
FIG. 2 is a top view of the enclosure of FIG. 1.

FIG. 1 is an end view, and FIG. 2 is a top view of an enclosure 100 for housing a genset 10, according to an embodiment. The genset 10 can include an engine (e.g., a diesel engine, a gasoline engine, a natural gas engine, a dual fuel engine, a biodiesel engine, an E85 engine, a flex fuel engine, a gas turbine, etc.) and a generator coupled thereto. In various embodiments, the engine may be include a high horse power (HHP) engine capable of providing power in the range of 500 hp to 4,500 hp or even more.

The enclosure 100 includes a container 110 defining an internal volume for housing the genset 10. The container 110 includes a container floor 112, a container roof 114 and a pair of container sidewalls 116 positioned parallel to a longitudinal axis $A_L$ of the container 110. The container floor 112 and the container roof 114 are coupled at their lateral edges to edges of the corresponding container sidewalls 116. One or more doors (not shown) may be provided in one or both of the container sidewalls 116 to allow an operator of the genset 10 (e.g., maintenance or repair personnel) to enter the internal volume defined by the container 110 and access the genset 10. A pair of container endwalls 118 are positioned at longitudinal ends of the container 110 and coupled to corresponding edges of the container floor 112, the container roof 114 and the pair of container sidewalls 116 so as to seal the container 110. The container floor 112, roof 114, sidewalls 116, and endwalls 118 may be formed from any suitable material, for example, corrugated weathering steel. Furthermore, the container 110 may have the dimensions of a standard ISO container (e.g., a length of about 6.1 meters, 12.2 meters, 14.6 meters or about 16.2 meters and a height of about 2.59 meters, 2.9 meters, or about 3.2 meters). In other embodiments, the container 110 may include a non-ISO container, for example, any non-standard sized ISO container. The container 110 may be formed from flat sheet metal, die-stamped sheet metal or a non-metallic material (e.g., wood, plastics, reinforced polymers, cement, concrete, fiber glass, carbon fiber, etc.).

In various embodiments, inner surfaces of the container floor 112, the container roof 114, the pair of container sidewalls 116, and the pair of container endwalls 118 may be lined with fibrous acoustic dampening materials (e.g., rock wool, glass wool, mineral wool, etc.) or non-fibrous acoustic dampening materials (e.g., polyurethane foam, melamine foam, etc.).

In some embodiments, the container 110 may be disposed on the ground. In other embodiments, the container 110 may be mounted on a fuel tank (not shown) that is disposed on the ground, or mounted on skids (not shown) that are disposed on the ground.

The container 110 is configured to provide efficient air flow to cool the genset 10 and provide intake air for the engine of the genset 10. As shown in FIG. 2, the container 110 includes an air inlet 130 defined in the container roof 114. The air inlet 130 may include louvers 132 or otherwise openings that allow air to enter the container 110, while redirecting water (e.g., due to rainfall) away from the genset 10 to predefined water drainage areas of the container 110. An air outlet 140 is also provided in the container roof 114. Louvers 142 or otherwise openings may also be provided in the air outlet 140 that allow air to enter the container 110 while redirecting water away from the genset 10 towards predefined water drainage areas. In other embodiments, the air inlet 130 and the air outlet 140 may be provided in at least one of the container roof 114, the pair of container endwalls 118 and the pair of container sidewalls 116.

The enclosure 100 also includes a side cap 120 positioned parallel to each of the pair of container sidewalls 116 along a longitudinal length of the container 110. Each of the side caps 120 is sealed to edges of the corresponding container sidewall 116 so as to define an acoustic cavity therebetween. Each of the pair of container sidewalls 116 generally provides the largest area for acoustic noise leakage. Furthermore, doors are generally located on one or both of the pair of sidewalls 116 and also result in significant noise leakage when the doors are opened to access the internal volume defined by the container 110. Thus, forming acoustic cavities around the pair of container sidewalls 116 by positioning the side caps 120 adjacent and parallel thereto provides significant noise reduction. The side caps 120 are sealed to the container 110 so that the acoustic noise leakage is reduced. In some embodiments, the side caps 120 span the entire length of the container 110. In other embodiments, the side caps 120 may have a length that is shorter than the length of the container 110, for example, strategically located at areas of the corresponding container sidewalls 116 where noise leakage is of concern. By providing an air filled acoustic cavity, avoiding line of sight openings, and providing a tortuous path, the side caps 120 provide significant acoustic noise reduction.

Expanding further, each of the side caps 120 comprises a side cap floor 122, a side cap roof 124, a pair of side cap endwalls 128 positioned at longitudinal ends of the side cap 120, and a side cap sidewall 126 disposed distal from the corresponding container sidewall 116. Each of the side caps 120 may be formed from the same material as the container 110, for example, die stamped corrugated weathered steel. A side cap door 123 may be defined in one or both of the pair of side cap endwalls 128 to allow a user to enter the acoustic cavity and subsequently enter the interior volume defined in the corresponding container sidewall 116 via the door defined therein. In some embodiments, an acoustic compliance layer (e.g., an acoustic foam, rubber padding, rock wool, glass wool, etc.) may be disposed on inner surfaces of at least the side cap sidewall 126, and the side cap roof 124, to provide acoustic sealing of the interface between each of the side caps 120 and the container 110.

In some embodiments, each of the side caps 120 may be formed by cutting (e.g., via a reciprocating/rotating saw or plasma cutter) standard sized containers in half (e.g., containers having half the height of the container 110) and stacking one half over the other. Using containers to form the side caps 120 provides ease of manufacturing and utilizing the inherent strength of the container material (e.g., die stamped corrugated weather steel), such that the side cap 120 has sufficient stiffness without using any additional stiffeners. This reduces manufacturing complexity and time, reduces materials and labor cost, and reduces weight. In some embodiments, forming the side cap 120 may include removing a roof of the bottom container half and a floor of the top container half before stacking and joining the halves (e.g., via welding) such that the acoustic cavity defined between the side cap 120 and the corresponding container sidewall 116 extends continuously from the side cap floor 122 to the side cap roof 124. In other embodiments, the roof of the bottom container half is removed but the floor of the top container half is not removed such that the resulting acoustic cavity formed between the side cap 120 and the corresponding sidewall 116 includes an acoustic cavity first portion extending from the side cap floor 122 formed by the bottom container half to the floor of the top container half, and an acoustic cavity second portion extending from the floor of the top container half to the roof thereof that forms the side cap roof 124. In some embodiments, the container 110 may be elevated from the ground (e.g., mounted on a fuel tank or a mounting platform). In such embodiments, the height of the container halves used to form the side cap 120 are selected such that a total height of each of the side caps 120 is equals to the elevation of the container roof 114 measured from the ground.

In some embodiments, the side caps 120 may be formed from ISO containers. In other embodiments, the side caps 120 may be assembled using any other suitable method, for example, welding together sheets of flat sheet metal or die-stamped steel, or from a non-metallic material (e.g., wood, plastics, reinforced polymers, cement, concrete, fiber glass, carbon fiber, etc.). In various embodiments, inner surfaces of the side cap floor 122, the side cap roof, 124, the side cap sidewall 126, and the pair of side cap endwalls 128 may be lined with fibrous acoustic dampening materials (e.g., rock wool, glass wool, mineral wool, etc.) or non-fibrous acoustic dampening materials (e.g., polyurethane foam, melamine foam, etc.).

Inner edges of at least the side cap roof 124 and the pair of side cap endwalls 128 located distal from the side cap sidewall 126 are sealed to edges of the corresponding container sidewall 116. For example, in some embodiments, the inner edges may be positioned flush with outer edges of the corresponding container sidewall 116. In some embodiments, the interface or seam formed therebetween may be sealed with padding, an adhesive, or welding. In other embodiments, an acoustic compliance layer 125 may be positioned between the inner edges of at least the side cap roof 124 and the pair of side cap endwalls 128, and outer edges of the corresponding container sidewall 116. The acoustic compliance layer 125 may include, for example, a rubber strip, foam, polymers or any other acoustic dampening material. In some embodiments, the inner edges may be positioned flush with the acoustic compliance layer 125 but not coupled thereto, which may still provide sufficient acoustic sealing. In other embodiments, adhesives may be used to seal the inner edges to the acoustic compliance layer 125. In some embodiments, securing members 129 may be used to removably secure the side caps 120 to the container 110. Securing members 129 may include clamps, screws, nuts, bolts, rivets, etc.

In some embodiments, the enclosure 100 or any other enclosure described herein may be transported, for example, to an installation site with the side caps 120 coupled to the container 110. In other embodiments, the side caps 120 and the container 110 may be shipped separately and the side caps 120 interfaced or otherwise coupled to the containers 110 on site. In still other embodiments, the side caps 120 may include side cap panels stowed within the body of the container 110 during transportation, for example, a first side cap panel stowed proximate to the container roof 114 and a second side cap panel stowed proximate to the container floor 112. Once the container 110 is installed at the installation site, the side cap panels may be extended or slid out from the container 110. In such embodiments, the first side cap panel may include a first side cap panel main portion configured to form the side cap floor 122 and the second side cap panel may include a second side panel main portion configured to form the side cap roof 124. Moreover, each of the first and second side cap panels may include a first and second side cap panel articulating portion hingedly coupled to outer edges of the first and second side cap panel main portions, respectively and configured to articulate from outer edges of the first and second side cap panel main portions, respectively. The outer edges of the first and second side cap panel articulating portions may then be coupled together at their outer edges to form the side cap sidewall 126. The side cap endwalls 128 may be similarly stored in the container 110 or provided separately and subsequently coupled to the side cap floor 122, the side cap roof 124, and the side cap side wall 126 so as to assemble the side cap 120.

Figure 3:
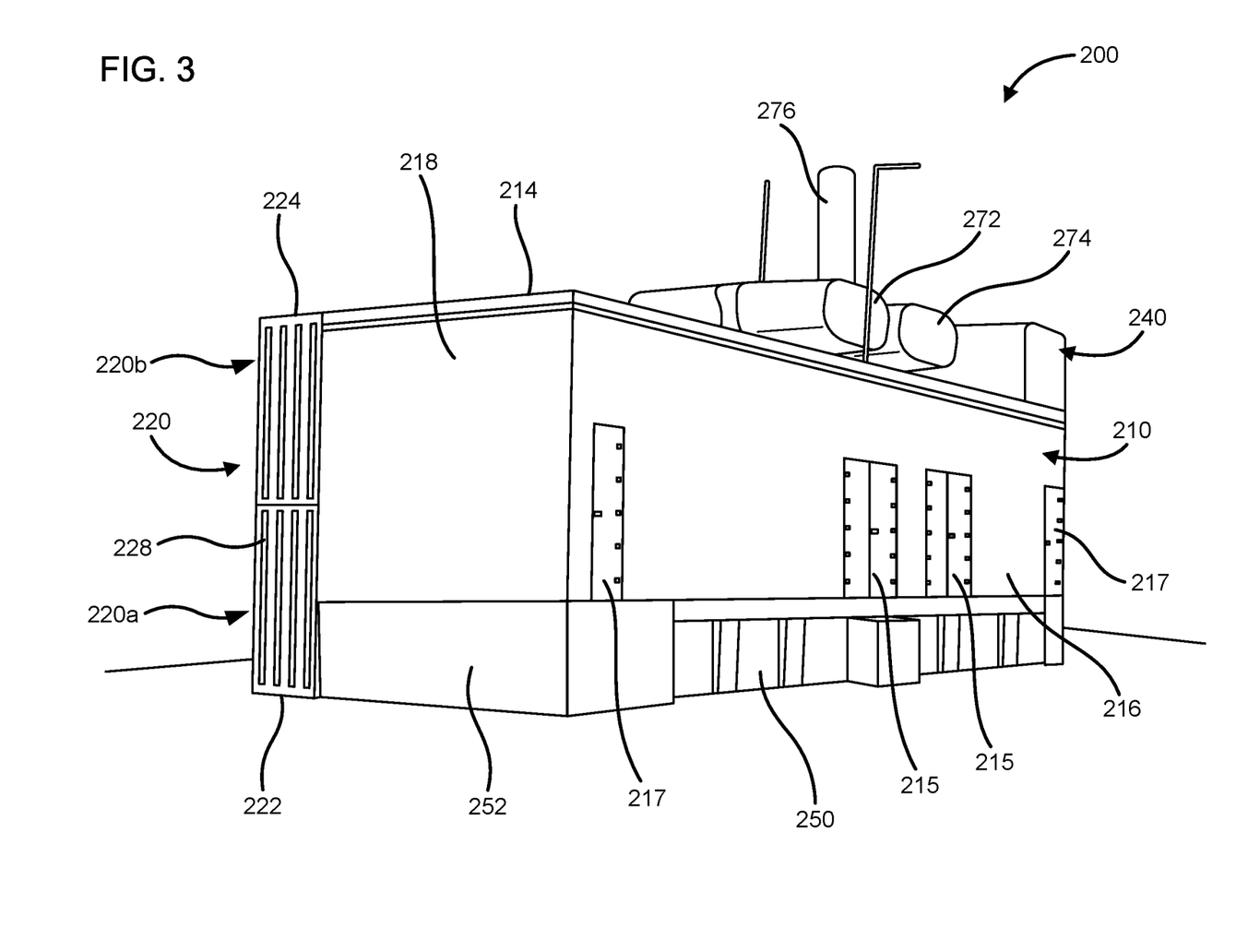
FIG. 3 a perspective view of an enclosure including a container for housing a genset, according to another embodiment.
Figure 4:
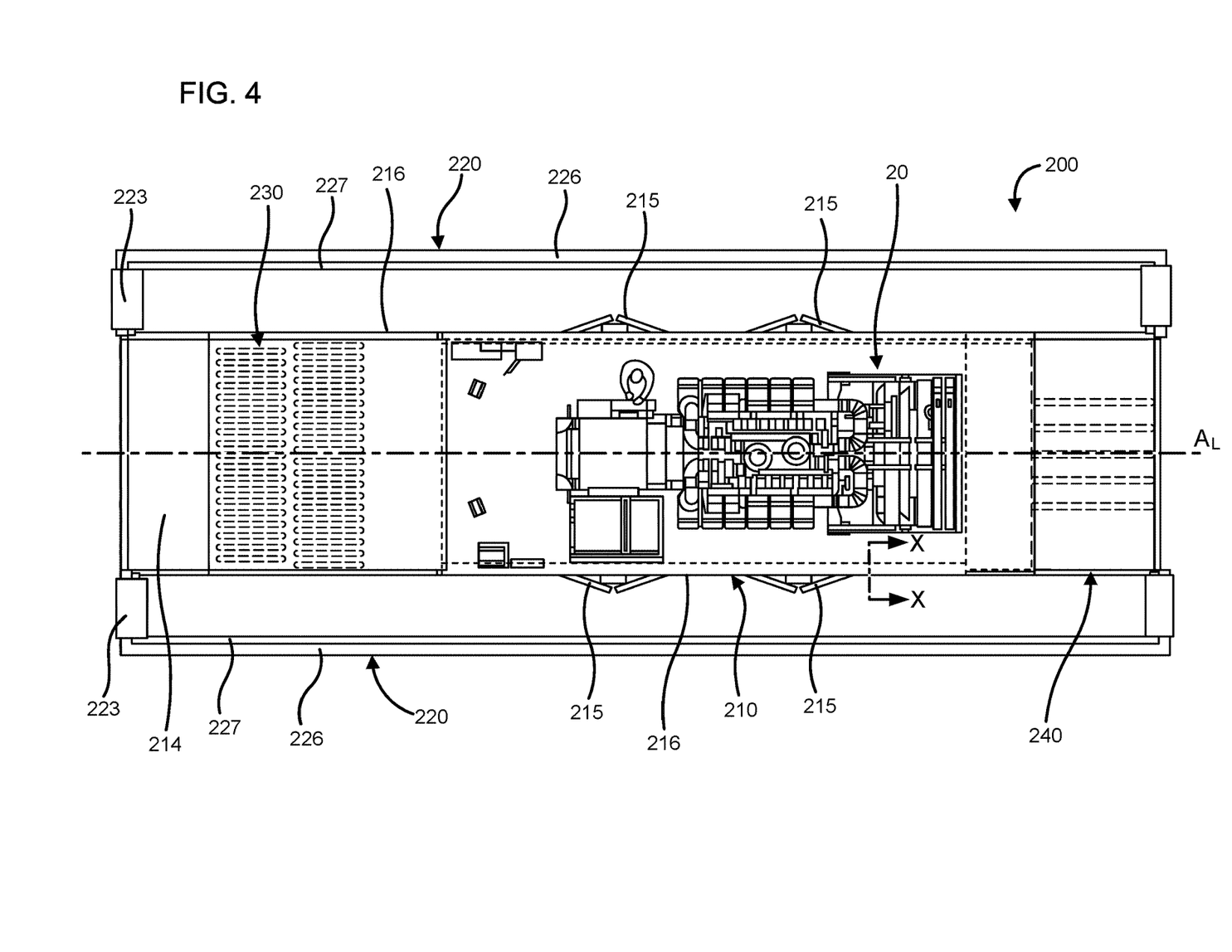
FIG. 4 is a top view of the enclosure of FIG. 3 with a roof of the container removed.

FIG. 3 shows a perspective view and FIG. 4 shows a top view of an enclosure 200 for housing a genset 20, according to an embodiment. The genset 20 may be substantially similar to the genset 10. The enclosure 200 includes a container 210 defining an internal volume for housing the genset 20. The container 210 includes a container floor (not shown), a container roof 214 and a pair of container sidewalls 216 positioned parallel to a longitudinal axis $A_L$ of the container 210. The container floor and the container roof 214 are coupled at their edges to the corresponding container sidewall 216. A pair of container endwalls 218 are positioned at longitudinal ends of the container 210 and coupled to corresponding edges of the container floor, the container roof 214 and the pair of container sidewalls 216 so as to seal the container 210. The container floor, roof 214, sidewalls 216, and endwalls 218 may be formed from any suitable material, for example, corrugated weathering steel. Furthermore, the container 210 may have the dimensions of a standard ISO container (e.g., a length of about 6.1 meters, 12.2 meters, 14.6 meters, or about 16.2 meters and a height of about 2.59 meters, 2.9 meters, or about 3.2 meters).

A first set of doors 215 is provided in each of the container sidewalls 216 proximate to a center portion of the corresponding container sidewall 216 and configured to provide access into the internal volume (e.g., to allow an operator of the genset 20 or maintenance personnel to access the genset 20). A second set of doors 217 is also provided in each of the container sidewalls 216, with each door 217 being located at one longitudinal end of the corresponding container sidewall 216. The second set of doors 217 are provided to allow access into end portions of the container 210 that may house a control panel for the genset 20, or water collection pans.

As shown in FIG. 4, the container 210 includes an air inlet 230 defined in the container roof 214. The air inlet 230 may include openings (e.g., slits or openings defined between louvers) allowing air to enter the container 210, while redirecting water (e.g., due to rainfall) away from the genset 20 to predefined water drainage areas of the container 210, for example, provided in the end portions of the container 210. An air outlet 240 is also provided in the container roof 214. Openings (e.g., slits or openings defined between louvers) may also be provided in the air outlet 240 for redirecting water away from the genset 20 towards predefined water drainage areas. A primary silencer 232 and a secondary silencer 234 are disposed on the container roof 214. The primary and second silencers 232, 234 are coupled to an exhaust of an engine included in the genset 20 and configured to reduce exhaust gas noise generated by the engine. An exhaust tube 236 extends away from the secondary silencer 234 and is configured to expel exhaust gas into the atmosphere.

As shown in FIG. 3, the container floor is elevated from a ground on which the container 210 is disposed. A fuel tank 250 is positioned on the ground and the container 210 is positioned thereon. The enclosure 200 also comprises a skirt 252 disposed at each of the longitudinal ends of the container 210. The skirt 252 extends from a lower end of each of the pair of container endwalls 218 to the ground. Lateral ends of the skirt 252 may also wrap around the lowers ends of the container endwalls 218 such that portions of the skirt 252 also extend from lowers edges of corresponding longitudinal ends of the pair of container sidewalls 216 to the ground. The skirt 252 is configured to provide an acoustic barrier to reduce acoustic noise leakage from below the container 210. The skirt 252 may be formed from any suitable acoustic dampening material, for example, plastics, polymer, rubber, etc. Using a skirt 252 made from cheap and flexible materials reduces material usage and provide further reduction in weight of the enclosure 200, relative to heavy concrete padding that is conventionally used to support over hanging end portions of a genset container.

The enclosure 200 also includes a side cap 220 positioned parallel to each of the pair of container sidewalls 216 along a longitudinal length of the container 210. FIG. 3 shows the enclosure 200 with one of the side caps 220 removed. Each of the side caps 220 is sealed to edges of the corresponding container sidewall 216 so as to define an acoustic cavity therebetween so as to provide acoustic noise reduction, as previously described herein. Furthermore, a portion of each of the side cap 220 extends below the container sidewalls 216 to the ground to prevent leakage of acoustic noise from below the space between the container floor and the ground.

Each of the side caps 220 is formed from a side cap first portion 220a and a side cap second portion 220b, stacked on the side cap first portion 220a and coupled thereto (e.g., welded together). Each of the side cap first portion 220a and the side cap second portion 220b is formed by cutting standard sized containers in half, one of the half forming the side cap first portion 220a, and the other half forming the side cap second portion 220b, as previously described herein. A height of each of the container halves used to form the side cap 220 are selected such that a total height of each of the side caps 220 is equal to the elevation of the container roof 214 measured from the ground.

Each of the side caps 220 comprises a side cap floor 222, a side cap roof 224, a pair of side cap endwalls 228 positioned at longitudinal ends of the side cap 220, and a side cap sidewall 226 disposed distal from the corresponding container sidewall 216. A side cap door 223 is provided in both of the pair of side cap endwalls 228 to allow a user to enter the acoustic cavity and subsequently enter the interior volume defined in the corresponding container sidewall 216 via the first set of doors 215 or the second set of doors 217) defined therein. A side cap acoustic barrier layer 227 (e.g., an acoustic foam, rubber padding, rock wool, glass wool, etc.) is disposed on inner surfaces of at least the side cap sidewall 226 and the side cap roof 224 to prevent acoustic noise leakage at the interface between the side caps 220 and the container 210.

Inner edges of at least the side cap roof 224 and the pair of side cap endwalls 228 located distal from the side cap sidewall 226 are sealed to edges of the corresponding container sidewall 216. For example, in some embodiments, the inner edges may be positioned flush with outer edges of the corresponding container sidewall 216. In some embodiments, the seam formed therebetween may be sealed with padding, an adhesive, or welding. In other embodiments, an acoustic compliance layer 225 (e.g., as described with respect to the container 110) may be positioned between the inner edges of at least the side cap roof 224 and the pair of side cap endwalls 228, and outer edges of the corresponding container sidewall 216. In some embodiments, the inner edges may be positioned flush with the acoustic compliance layer 225 but not coupled thereto, and still provide sufficient acoustic dampening. In other embodiments, adhesives may be used to seal the edges to the acoustic compliance layer 225. In some embodiments, securing members may be used to removably secure the side caps 220 to the container 210, as previously described herein.

Figure 5:
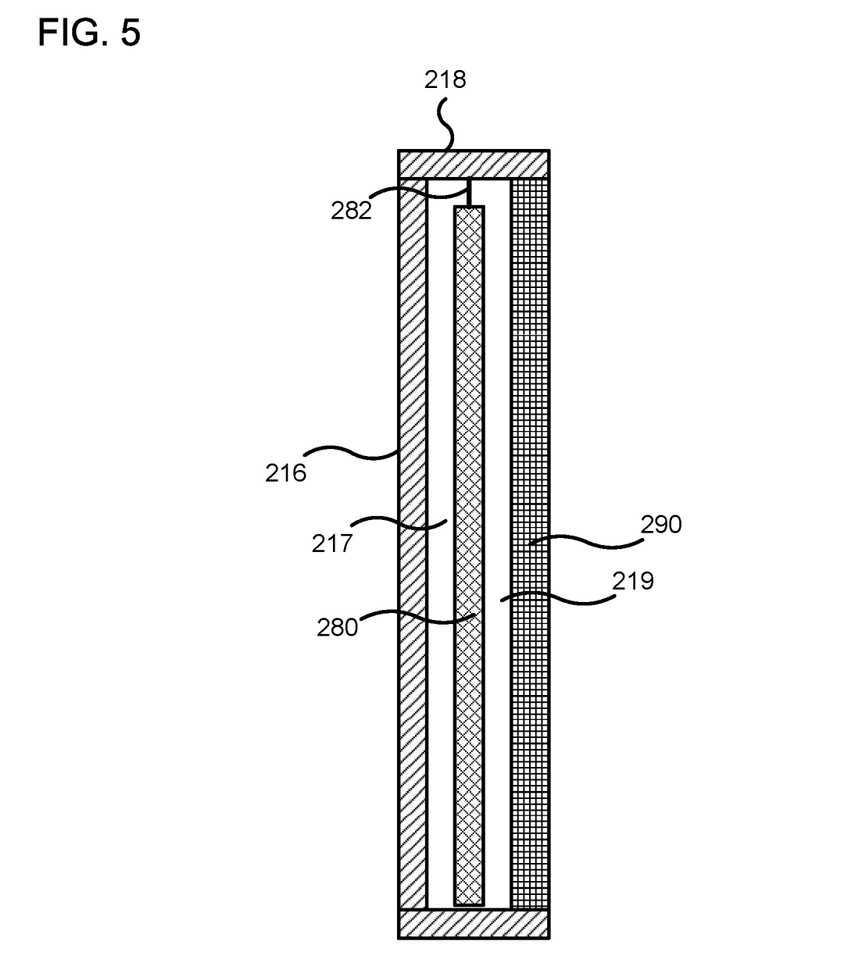
FIG. 5 is a side cross-section view of a portion of a container sidewall of the container of FIGS. 3-4, taken along the line X-X in FIG. 4.

In some embodiments, various acoustic noise reduction features may be provided in the container 210 to also facilitate acoustic noise reduction. FIG. 5 shows a side cross-section view of a portion of container 210 including the container sidewall 216 of the container 210 taken along the line X-X in FIG. 4. The container sidewall 216 may be formed from sheet metal or corrugated weathered iron. In some embodiments, dry wall may be disposed on an inner surface of the container sidewall 216.

An acoustic barrier layer 280 is suspended parallel to the corresponding container sidewall 216 within the internal volume and spaced apart from the corresponding container sidewall 216 so as to form a first acoustic cavity 281 (i.e., a first air gap) therebetween. The acoustic barrier layer 280 may be suspended from the container roof 214 via suspension members 282, for example, a suspension railing, rivets, hooks, etc. The acoustic barrier layer 280 may be formed from any suitable material that has acoustic noise blocking property that dampens vibration, for example, rubber, elastomers, polymers, foam, plastic, foam, or any other suitable material. Clearance may be provided between the bottom end of the acoustic barrier layer 280 and the container floor such that the acoustic barrier layer 280 is suspended freely and does not contact the container floor or the container roof 214. This reduces transmission of acoustic vibrations from the acoustic barrier layer 280 to the container floor or container roof 214.

An acoustic dampening material layer 290 is positioned parallel to the acoustic barrier layer 280 distal from the corresponding container sidewall 216 and spaced apart from the acoustic barrier layer 280 so as to form a second acoustic cavity 283 (i.e., a second air gap) therebetween. The acoustic dampening material layer 290 is configured to absorb and dampen acoustic noise generated by the genset 20. At least a portion of the acoustic noise (i.e., sound waves) that may be transmitted through the acoustic dampening material layer 290 is reflected back from the acoustic barrier layer 280 to the acoustic dampening material layer 290, therefore providing another opportunity for the acoustic dampening material layer 290 to absorb the acoustic noise. Multiple internal reflections of the acoustic waves may occur which further helps dampen the acoustic noise.

Figure 6:
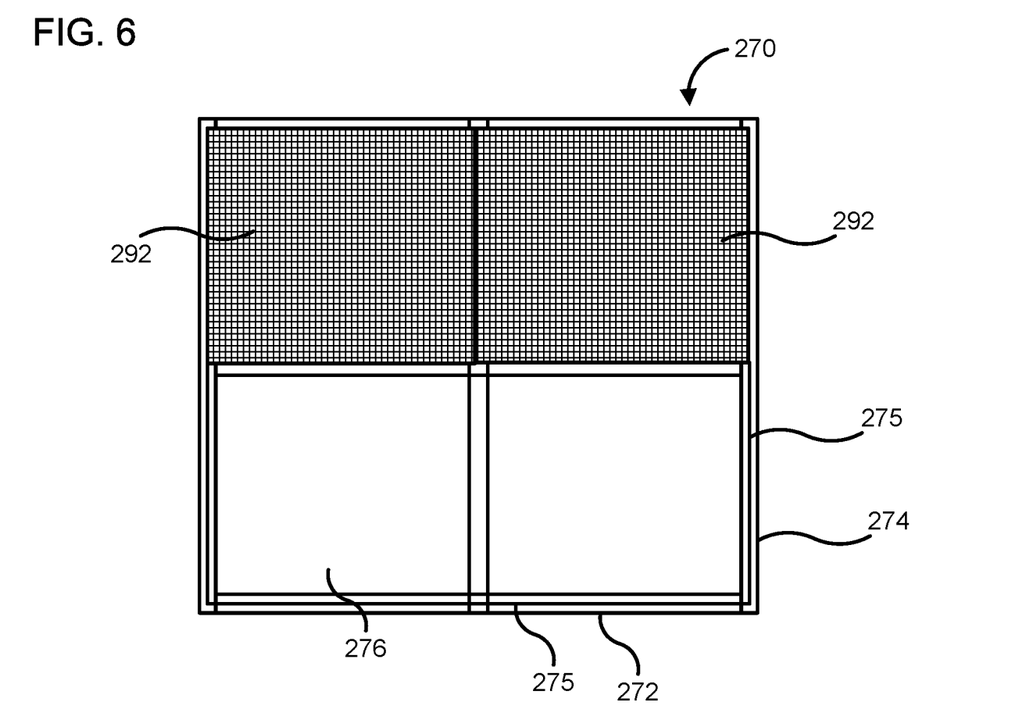
FIG. 6 is a schematic illustration of a support structure configured to secure a plurality of acoustic dampening material layer panels therein.

In some embodiments, the acoustic dampening material layer 290 may be mounted or secured parallel to the container sidewalls 216 and, in particular embodiments, parallel to the container 210 via a support structure. For example, FIG. 6 shows a schematic illustration of a support structure 270 for mounting a plurality of acoustic dampening material layer panels 292 parallel to the container sidewall 216 or the container roof 214, the plurality of acoustic dampening material layer panels 292 forming the acoustic dampening material layer 290. The support structure 270 comprises a plurality of horizontal rods 272 and a plurality of vertical rods 274 positioned perpendicular to the plurality of horizontal rods 272 in a grid, such that slots 276 are formed therebetween. Each slot 276 is configured to receive a single acoustic dampening material layer panel 292. Lips 275 may be provided on each of the horizontal and vertical rods 272, 274 to allow an acoustic dampening material layer panel 292 to be tucked in at their edges, such that each panel 292 can be easily disposed in or removed from the support structure 270. This facilitates installation in contrast to conventional methods where perforated sheet metal is used to mount conventional acoustic barrier materials such as rock wool, mineral wool or glass wool. Thus, labor cost is reduced and safety is improved. In some embodiments, adhesives may be used to seal the interface between the edges of each acoustic dampening material layer panel 292 and the support structure 270. In other embodiments, any non-fibrous, fibrous, or foam material may be used to form the acoustic dampening material layer 290.

Figure 7:
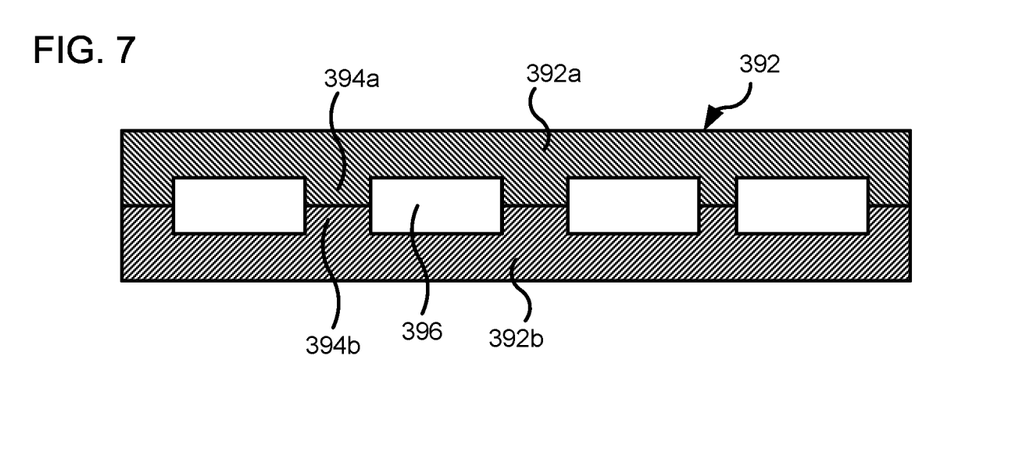
FIG. 7 is a side view of a ducted cavity acoustic material (DCAM) panel, according to an embodiment.

In some embodiments, the acoustic dampening material layer panel 292 may be formed from a ducted cavity acoustic material (DCAM). For example, FIG. 7 is a side view of a DCAM panel 392, according to an embodiment. The DCAM panel 392 may include a first portion 392a having a plurality of first portion protrusions 394a, and a second portion 392b having a plurality of corresponding second portion protrusions 394b. In particular embodiments, each of the first and second portion 392a/b may be formed from foam (e.g., melamine foam or polyurethane foam). The first and second portions 392a/b are coupled together (e.g., via adhesives or fusion bonding) such that the first and second portion protrusions 394a/b are aligned with each other and acoustic ducts 396 are formed in the DCAM panel 392. In some embodiments, each of the acoustic ducts 396 may have a rectangular cross-section. In other embodiments, the acoustic ducts 396 may have a square, circular, elliptical, hexagonal, octagonal, or any other suitable cross-section.

In some embodiments, the other layers may be disposed on outer surfaces of each of the acoustic dampening material layer panel 292 (e.g., the DCAM panel 392). Such layers may include films or scrims used to modify the acoustic properties of the acoustic dampening material layer panel 292, for example, make the acoustic dampening material layer panel 292 fireproof, waterproof, and improve structural integrity, etc. In some embodiments, the acoustic dampening material layer panel 292 may further includes a protective layer for decoupling or to reduce dirt and oil fouling of the acoustic dampening material layer panel 292.

Figure 8:
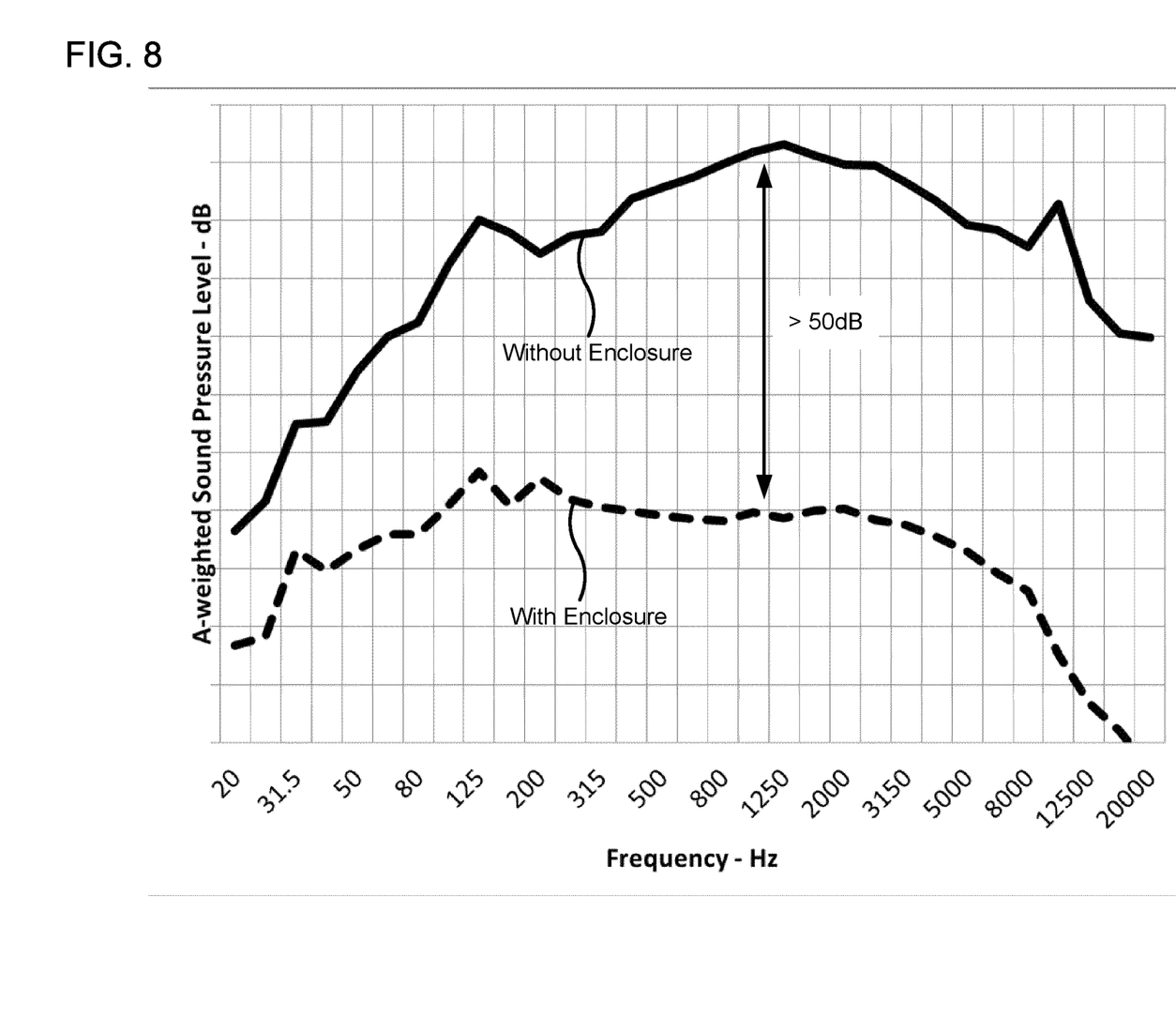
FIG. 8 shows plots of acoustic noise being detected around a genset with, and without the enclosure of FIGS. 3-4.

FIG. 8 shows a plot of acoustic noise emitted from the genset 20 in the 20-20,000 Hz measured inside (with) and outside (without) the enclosure 200. Greater than 50 dB reduction in acoustic noise is observed via the enclosure 200.

Figure 9:
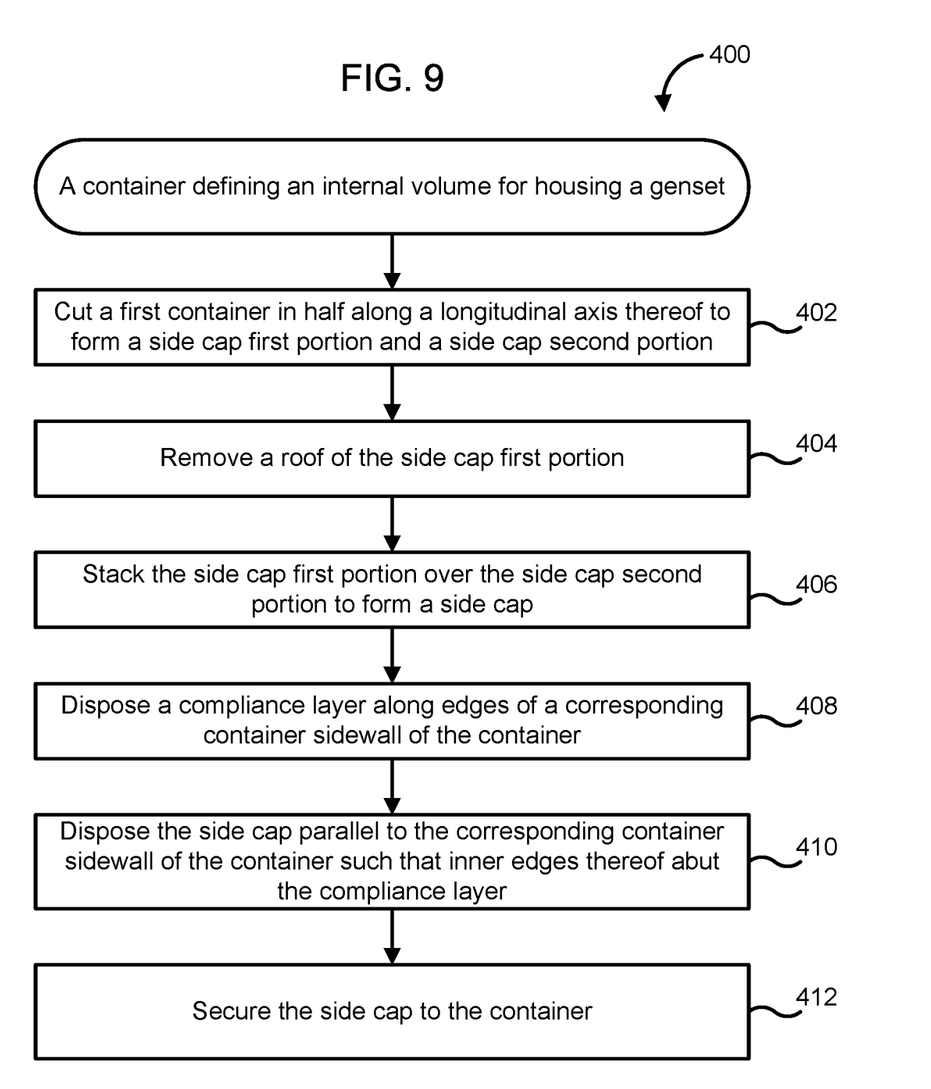
FIG. 9 is a schematic flow diagram of a method for reducing acoustic noise of a container for a genset, according to an embodiment.

FIG. 9 is a schematic flow diagram of a method 400 for reducing acoustic noise emanating from a container (e.g., the container 110, 210) configured to house a genset (e.g., the genset 10, 20). The method 400 includes cutting a first container in half along a longitudinal axis thereof to form side cap first portion (e.g., the side cap first portion 220a) and a side cap second portion (e.g., the side cap second portion 220b), at 402. In some embodiments a roof of the side cap first portion is removed, at 404. At 406, the side cap second portion is disposed or stacked on top of the side cap first portion to form a side cap (e.g., the side cap 120, 220). The side cap first and second portions may be coupled to each other, for example, welded to each other. In some embodiments, a floor of the side cap second portion may also be removed before disposing the side cap second portion on top of the side cap first portion.

In some embodiments, a compliance layer (e.g., the acoustic compliance layer 125) is disposed along edges of a corresponding container sidewall (e.g., the container sidewall 116, 216), at 408. At 410, the side cap is disposed parallel to the corresponding container sidewall such that inner edges thereof abut the compliance layer and are sealed (i.e., acoustically sealed) therewith. In other embodiments in which the compliance layer is not used, the inner edges abut the corresponding edges of the corresponding container sidewall. Adhesives, padding, or foam may be used to seal the interface between the inner edges of the side cap and the corresponding compliance layer or the corresponding container sidewall. At 412, the side cap is secured to the container, for example, via securing members 129 (e.g., clamps, screws, nuts, bolts, rivets, etc.).

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Other substitutions, modifications, changes and omissions may also be made in the design, operating conditions and arrangement of the various exemplary embodiments without departing from the scope of the present invention.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. An enclosure for a genset, comprising:
 a container defining an internal volume for housing the genset, the container comprising:
  a container floor;
  a container roof;
  a pair of container sidewalls disposed parallel to a longitudinal axis of the container; and
  a pair of container endwalls disposed at longitudinal ends of the container; and
 a pair of side caps disposed outside of the internal volume, each side cap of the pair of side caps positioned parallel to a corresponding sidewall of the pair of container sidewalls along a longitudinal length of the container, each side cap of the pair of side caps sealed to edges of the corresponding sidewall of the pair of container sidewalls so as to define an acoustic cavity therebetween.

2. The enclosure of claim 1, wherein each side cap of the pair of side caps comprises:

a side cap floor;
a side cap roof;
a pair of side cap endwalls positioned at longitudinal ends of the side cap floor and the side cap roof; and
a side cap sidewall disposed distal from the corresponding sidewall of the pair of container sidewalls,
wherein the side cap roof and the pair of side cap endwalls each define an inner edge located distal from the side cap sidewall, wherein each of the inner edges is sealed to a corresponding edge of the corresponding sidewall of the pair of container sidewalls.

3. The enclosure of claim 2, wherein the side caps are formed from ISO containers or flat metal or die-stamped corrugated metal sheets.

4. The enclosure of claim 2, further comprising an acoustic compliance layer positioned at an interface between (i) the inner edges of at least the side cap roof and the pair of side cap endwalls, and (ii) the corresponding container sidewall.

5. The enclosure of claim 1, wherein the container floor is elevated from a ground on which the container is disposed, and wherein the enclosure further comprises a skirt disposed at each of the longitudinal ends of the container, the skirt extending from at least a lower end of each of the pair of container endwalls to the ground.

6. The enclosure of claim 1, further comprising:
an acoustic barrier layer suspended parallel to each of the pair of container sidewalls within the internal volume, the acoustic barrier layer spaced apart from the corresponding container sidewall so as to form a first acoustic cavity therebetween; and
an acoustic dampening material layer positioned parallel to the acoustic barrier layer distal from the corresponding container sidewall, the acoustic dampening material layer spaced apart from the acoustic barrier layer so as to form a second acoustic cavity therebetween.

7. The enclosure of claim 6, wherein the acoustic dampening material layer comprises a ducted cavity acoustic material.

8. The enclosure of claim 1, wherein the container and the side caps are formed from flat sheet metal, die-stamped sheet metal, or a non-metallic material.

9. The enclosure of claim 1, wherein at least one of the container roof, the container floor, the pair of container side walls, and the pair of container endwalls, and at least a portion of inner surfaces of the side cap are lined with fibrous or non-fibrous acoustic dampening materials.

10. The enclosure of claim 1, wherein the container is an ISO container or a sheet metal container.

11. The enclosure of claim 1, further comprising an air inlet and an air outlet defined in at least one of the container roof, the pair of container endwalls, or the pair of container sidewalls.

12. The enclosure of claim 1, wherein the container is disposed on ground, disposed on a fuel tank that is disposed on the ground, or mounted on a skid that is disposed on the ground.

13. The enclosure of claim 1, wherein the pair of side caps is formed separately from the container.

14. A method for reducing acoustic noise emanating from a first container that is configured to house a genset, comprising:
cutting a second container in half along a longitudinal axis thereof to form a side cap first portion and a side cap second portion;
removing a roof of the side cap first portion;
disposing the side cap second portion on top of the side cap first portion to form a side cap;
disposing the side cap parallel to a corresponding container sidewall of the first container; and
securing the side cap to the first container.

15. The method of claim 14, wherein the side cap is disposed such that inner edges of the side cap abut corresponding edges of the corresponding container sidewall of the first container.

16. The method of claim 14, further comprising:
before disposing the side cap parallel to the corresponding container sidewall of the first container, disposing a compliance layer along edges of the corresponding container sidewall of the first container.

17. The method of claim 16, wherein the side cap is disposed such that inner edges of the side cap abut the compliance layer.

18. The method of claim 17, further comprising:
sealing an interface between the inner edges of the side cap and the compliance layer.

19. The method of claim 18, wherein the interface is sealed via adhesives, padding, and/or foam.

20. The method of claim 14, wherein the side cap second portion is coupled to the side cap first portion after being disposed thereon.

21. The method of claim 14, further comprising:
lining at least a portion of inner surfaces of the first container, and/or at least a portion of inner surfaces of the side cap with fibrous or non-fibrous acoustic dampening materials.

* * * * *